March 31, 1936. H. Y. NORWOOD 2,035,663
THERMOMETER
Filed July 20, 1932
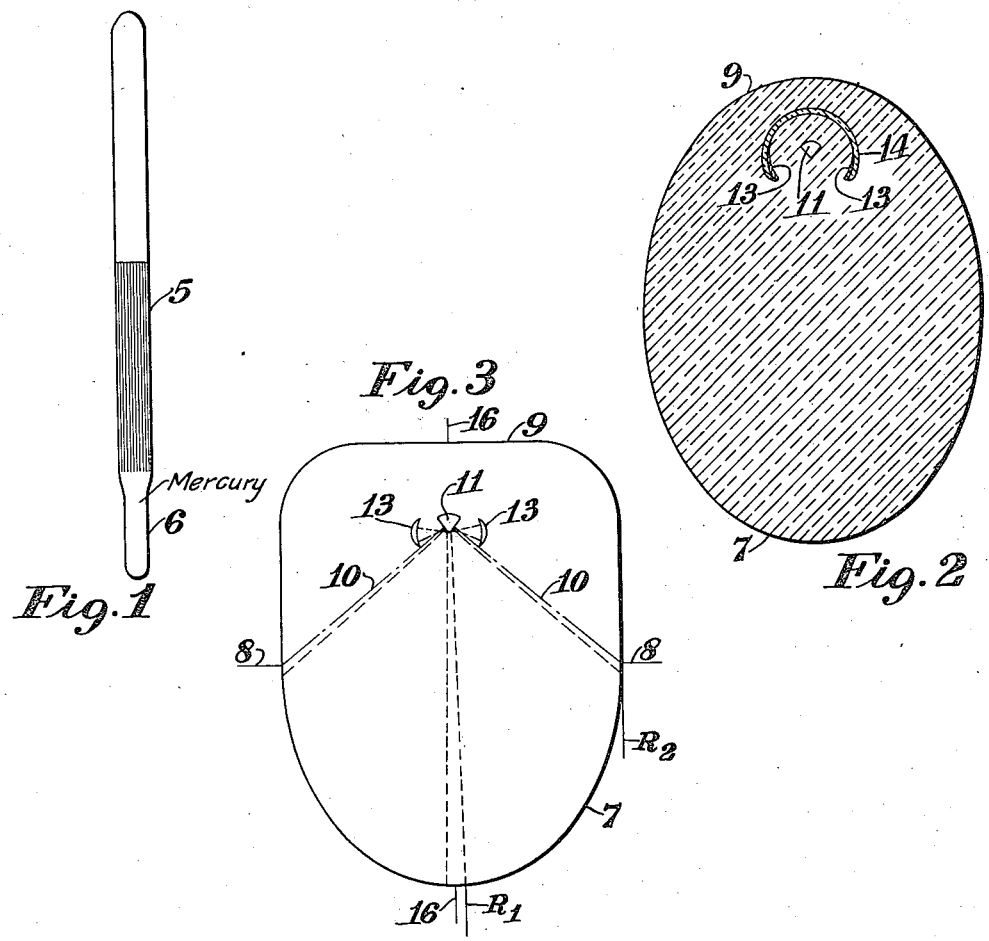

Patented Mar. 31, 1936

2,035,663

UNITED STATES PATENT OFFICE 2,035,663

THERMOMETER

Harry Y. Norwood, Rush, N. Y., assignor to Taylor Instrument Companies, Rochester, N. Y., a corporation of New York Application July 20, 1932, Serial No. 623,578

4 Claims. (Cl. 73—52)

This invention relates to thermometers.

In the more accurate types of thermometers, mercury is used as the indicating medium but since it is difficult to read, due to the lack of contrast with the glass of the thermometer tube, various expedients have been resorted to for facilitating the reading of the height of the mercury column. According to one proposed arrangement the surface of the mercury is employed to reflect an image of a colored strip toward the reading face of the thermometer tube, thereby creating the illusion that the mercury is colored. This experient, while useful, has failed to provide the maximum possible ease of reading since the width of the mercury column having the appearance of being colored, fails to be coextensive with the width of the tube when viewed from the normal reading position.

In accordance with the present invention, a novel arrangement is provided wherein the reading of the mercury column is facilitated by having the tube of such cross section that the mercury column appears to be equal to the width of the thermometer tube as viewed at the reading face, and to associate a colored strip with respect to the bore of the tube such that the height of the mercury column is indicated by a color reflected from the surface of the mercury.

Referring to the drawing, Fig. 1 is a front view of a thermometer according to one form of the present invention; Fig. 2 is a transverse sectional view thereof; Fig. 3 is a diagram useful in explaining the form of the invention shown in Figs. 1 and 2.

Referring especially to Figs. 1, 2 and 3, 5 designates a glass thermometer tube to which there is attached a bulb 6 containing mercury or any similar expansive medium which reflects light. As indicated in the enlarged transverse section of Fig. 2, the tube 5 is preferably elliptical in contour. It will be understood, however, that the contour of the transverse section may assume other forms provided that the reading face 7 of the tube in transverse section has essentially the contour of a semi-ellipse subtended by the minor axis 8 thereof, and provided that the contour of the backing portion 9 of the tube as indicated in section shall not intersect the lines 10, 10 (Fig. 3), connecting the ends of the minor axis of the ellipse and that focus of the ellipse which is adjacent to the backing portion. For convenience in description, the portion of the tube extending rearwardly from the extremities of the minor axis is herein referred to as "a backing portion", which term is intended to define all contours of the rear surface of the tube that include the rear focus of the tube and that do not intersect the lines 10, 10.

At the rear focus of the ellipse as shown in Fig. 2 or at the rear focus of the semi-ellipse as diagrammatically indicated in Fig. 3, there is provided a generally triangular bore 11 which has two diverging plane surfaces symmetrical about the major axis 16 of the ellipse and perpendicular to the lines 10. At each side of the bore and preferably roughly parallel with the plane surfaces of the bore, there are provided two strips 13 of enamel, glass or the like, colored red, blue or any other color contrasting with white. These colored strips have all parts thereof remote from the bore, covered by the light shield 14. The colored strips should preferably have their forward edges just terminate in planes defined by the lines 10, since if the edges of these strips extend beyond these planes toward the reading face of the tube, the width of the image of the mercury column will be restricted thereby. The positioning of the strips 13 with respect to the plane surfaces of the bore 11 is determined by tracing the path of all rays between the limiting rays R1 and R2. Ray R1 is assumed to be just slightly displaced from the major axis 16 although in the greatly enlarged section of Fig. 3, it appears to be displaced considerably from this axis. By tracing this ray through the glass of the tube to its related plane surface of the bore and then to the strip, the rear limit of the strip is determined; similarly by tracing ray R2 which is slightly displaced from line 10, the forward limit of the strip is determined. It will be understood that the rear limits of the strip may extend rearwardly beyond the mentioned rear limit, but the areas of these strips should not be unnecessarily extended since there is danger of the bore above the mercury column being slightly colored due to internal reflections of the strips within the bore.

It may be shown mathematically and experimentally that with the reading face of the tube 7 in section having substantially the contour of that portion of an ellipse subtended by its minor axis, in other words, a semi-ellipse, and with the bore placed at that focus of the ellipse which is remote from the reading face of the tube, the mercury column in the bore 11 when viewed through the reading face of the tube, will appear to have a width coextensive with the minor axis of said ellipse. By properly positioning the colored strips 13 with respect to the plane surfaces of the bore 11, all rays of light entering the reading face of the stem substantially parallel to the major axis of the ellipse will be reflected by the mercury in the bore in such a manner as to impinge on the surfaces of the colored strips. Under these conditions the image of the mercury column in the bore 11, in addition to appearing to be equal in width to the width of the minor axis, will also have the appearance of being colored throughout its width with the color of the strips 13.

I claim:

1. In a thermometer, a glass tube having a backing portion and a reading face, said reading face in transverse section having the contour of that portion of an ellipse subtended by the minor axis thereof, a bulb containing mercury or the like connected to said tube, said tube having a bore communicating with said bulb and located at that focus of said ellipse which is adjacent to said backing portion, said bore having two plane surfaces diverging toward said backing portion and symmetrically placed with respect to the major axis of said ellipse, a colored strip at each side of said bore and extending generally parallel thereto, the surface of each strip being generally parallel to the adjacent plane surface of said bore, said strips being positioned in the glass in the space between said backing portion and the boundary defined by straight lines extending from the extremities of the minor axis of said ellipse to a point between said focus and said backing portion whereby the mercury column is reflected in color substantially the full width of the thermometer tube, the faces of said strips remote from said bore being concealed by inconspicuous material.

2. In a thermometer, a glass tube having a backing portion and a reading face, said reading face in transverse section having the contour of that portion of an ellipse subtended by the minor axis thereof, a bulb containing mercury or the like connected to said tube, said tube having a bore communicating with said bulb and located at that focus of said ellipse which is adjacent to said backing portion, said bore having two plane surfaces diverging toward said backing portion and symmetrically placed with respect to the major axis of said ellipse, a colored strip in the glass at each side of said bore and extending parallel thereto, the surface of each strip being generally parallel to the adjacent plane surface of said bore, said strips having their forward edges as regards the reading face of said tube disposed approximately in planes extending from the extremities of the minor axis of said ellipse to said bore, whereby the mercury column is reflected in color substantially the full width of the thermometer tube.

3. In a thermometer, a glass tube having a backing portion and a reading face, said reading face in transverse section having the contour of that portion of an ellipse subtended by the minor axis thereof, a bulb containing mercury or the like connected to said tube, said tube having a bore communicating with said bulb and located at that focus of said ellipse which is adjacent to said backing portion, said bore having two plane surfaces diverging toward said backing portion and symmetrically placed with respect to the major axis of said ellipse, a colored strip in the glass at each side of said bore and extending parallel thereto, the surfaces of each strip being generally parallel to the adjacent plane surface of said bore, said strips having their forward edges as regards the reading face of said tube disposed approximately in planes extending from the bore to the extremities of the minor axis of said ellipse, and a continuous light shield positioned in the glass between said bore and the backing portion of the tube and concealing the outer surfaces of said strips.

4. In a thermometer, a glass tube having a backing portion and a reading face, said reading face in transverse section having the contour of that portion of an ellipse subtended by the minor axis thereof, a bulb containing mercury or the like connected to said tube, said tube having a bore communicating with said bulb and located at the focus of said ellipse which is adjacent to said backing portion, said bore having a plane surface inclined with respect to the major axis of said ellipse, a colored strip in the glass adjacent the plane surface of said bore and extending parallel thereto, the main surface of said strip being generally parallel to the plane surface of said bore, said strip having its forward edge as regards the reading face of said tube disposed approximately in a plane extending from the bore to one extremity of the minor axis of said ellipse, and a continuous light shield positioned in the glass between said bore and the backing portion of the tube and concealing the outer surface of said strip.

HARRY Y. NORWOOD.